United States Patent

Sasamoto

[11] Patent Number: 5,154,505
[45] Date of Patent: Oct. 13, 1992

[54] MOUNTING STRUCTURE FOR A LAMP BASE FOR AN AUTOMOBILE

[75] Inventor: Masayoshi Sasamoto, Hiroshima, Japan

[73] Assignee: Kato Hatsujyo Co., Ltd., Japan

[21] Appl. No.: 732,650

[22] Filed: Jul. 19, 1991

[30] Foreign Application Priority Data

Jul. 23, 1990 [JP] Japan .................................. 2-194458

[51] Int. Cl.⁵ .............................................. F21V 21/00
[52] U.S. Cl. ........................................ 362/80; 362/368
[58] Field of Search .................. 362/61, 80, 226, 365, 362/368, 382

[56] References Cited

U.S. PATENT DOCUMENTS

| | | | |
|---|---|---|---|
| 3,174,576 | 3/1965 | Woofter et al. | 362/80 |
| 4,198,674 | 4/1980 | Ilhage et al. | 362/80 |
| 4,318,162 | 3/1982 | Sip | 362/61 |
| 4,488,206 | 12/1984 | Mizusawa | 362/80 |
| 4,532,578 | 7/1985 | Gaden et al. | 362/80 |
| 4,539,626 | 9/1985 | Hawlitzki et al. | 362/66 |
| 4,569,002 | 2/1986 | English et al. | 362/80 |
| 4,628,417 | 12/1986 | Kaminski et al. | 362/80 |
| 4,703,400 | 10/1987 | Vescio et al. | 362/80 |
| 4,722,032 | 1/1988 | Kulka | 362/80 |
| 4,758,932 | 7/1988 | Coons | 362/80 |
| 4,809,139 | 2/1989 | Ryder et al. | 362/66 |
| 4,831,502 | 5/1989 | Fujino | 362/61 |
| 4,831,503 | 5/1989 | DeSantis et al. | 362/80 |
| 4,843,523 | 6/1989 | Nakamura | 362/69 |

FOREIGN PATENT DOCUMENTS 63-37448  3/1988  Japan .................................. 362/80

*Primary Examiner*—Richard R. Cole
*Attorney, Agent, or Firm*—Ladas & Parry

[57] ABSTRACT

In a mounting structure for mounting a lamp base on the outer peripheral surface of a vehicle body panel, first members are mounted in mounting holes in the vehicle body panel, second members are mounted on restraining frames formed on the front face portion of the lamp base, and with a third member inserted from first in a first member mounted on a side portion of the vehicle body panel, the lamp base is pressed in one direction to thereby removably mount the lamp base.

3 Claims, 6 Drawing Sheets

MOUNTING STRUCTURE FOR A LAMP BASE FOR AN AUTOMOBILE

BACKGROUND OF THE INVENTION

1. Field of the Invention

This invention relates to a mounting structure for a lamp base for an automobile mounted on the surface of the body panel of an automobile.

2. Related Background Art

The prior art includes, for example, Japanese Laid-Open Utility Model Application No. 63-37448.

In this example of the prior art, there is disclosed a mounting structure in which a plurality of engagement projections are projectedly provided on one side of a lamp base and at least one of these engagement projections is formed by a metallic pivot and the engagement projections are inserted into and engaged with the receiving hole portions of the vehicle body and a bolt mounting portion is formed on the other side of the lamp base and is fastened to the vehicle body by a bolt.

The above-described mounting structure is such that the lap base is brought into engagement with the surface of the vehicle body by means of a projection formed integrally with the lamp base, but one end of the lamp base is bolt-fastened to thereby mount the whole of the lamp base. A method which requires such bolt-fastening lacks mass productivity and moreover involves a great number of mounting steps.

Further, bolt-fastening is done for each one lamp base and therefore much time loss is also estimated and thus, bolt-fastening has not been desirably as an assembly-line operation.

SUMMARY OF THE INVENTION

The present invention has been made in view of the above-noted problems peculiar to the prior art and the object thereof is to provide a structure which eliminates a step such as bolt-fastening requiring time and in which a fixed resinous clip is provided on a lamp base to thereby enable the lamp base to be mounted by a one-touch operation such as pressing or sliding and also enable the lamp base to be removed by one operation.

DETAILED DESCRIPTION OF THE PREFERRED EMBODIMENTS

In order to achieve the above object, the mounting structure for a lamp base according to the present invention is a mounting structure for mounting a lamp base on the outer peripheral surface of a vehicle body panel, characterized in that first members are mounted in mounting holes in said vehicle body panel and second members are mounted on restraining frames formed on the front face portion of said lamp base, and with a third member inserted from first in a first member mounted on a side portion of said vehicle body panel, the lamp base is pressed in one direction to thereby removably mount the lamp base.

Also, the mounting structure for a lamp base for an automobile according to the present invention is characterized in that said restraining frames are molded integrally with the back of the lamp base, and a slide path for slidably inserting the second member and a receiving groove for holding it are formed in the upper surface thereof.

The first members are pre-mounted in the mounting holes in the vehicle body panel, and the second members are mounted on the front face portion of the lamp base, and if the lamp base is intactly pressed, the lamp base can be fixed at a predetermined location and mounted very simply.

Also, if the first members and the third member are mounted on a side portion of the panel at a time, whereby the lamp base is intactly slidden, the lamp base is inserted into the restraining frames, whereby the side portion can likewise be stably fixed to the panel.

Also, said restraining frames are formed on the back of said lamp base, and each of these restraining frames is formed with a slide path and a receiving groove for receiving the second member therein to impact a holding force when mounting the lamp base.

The mounting structure for a lamp base for an automobile according to the present invention will hereinafter be described with reference to the drawings.

Figure 1:
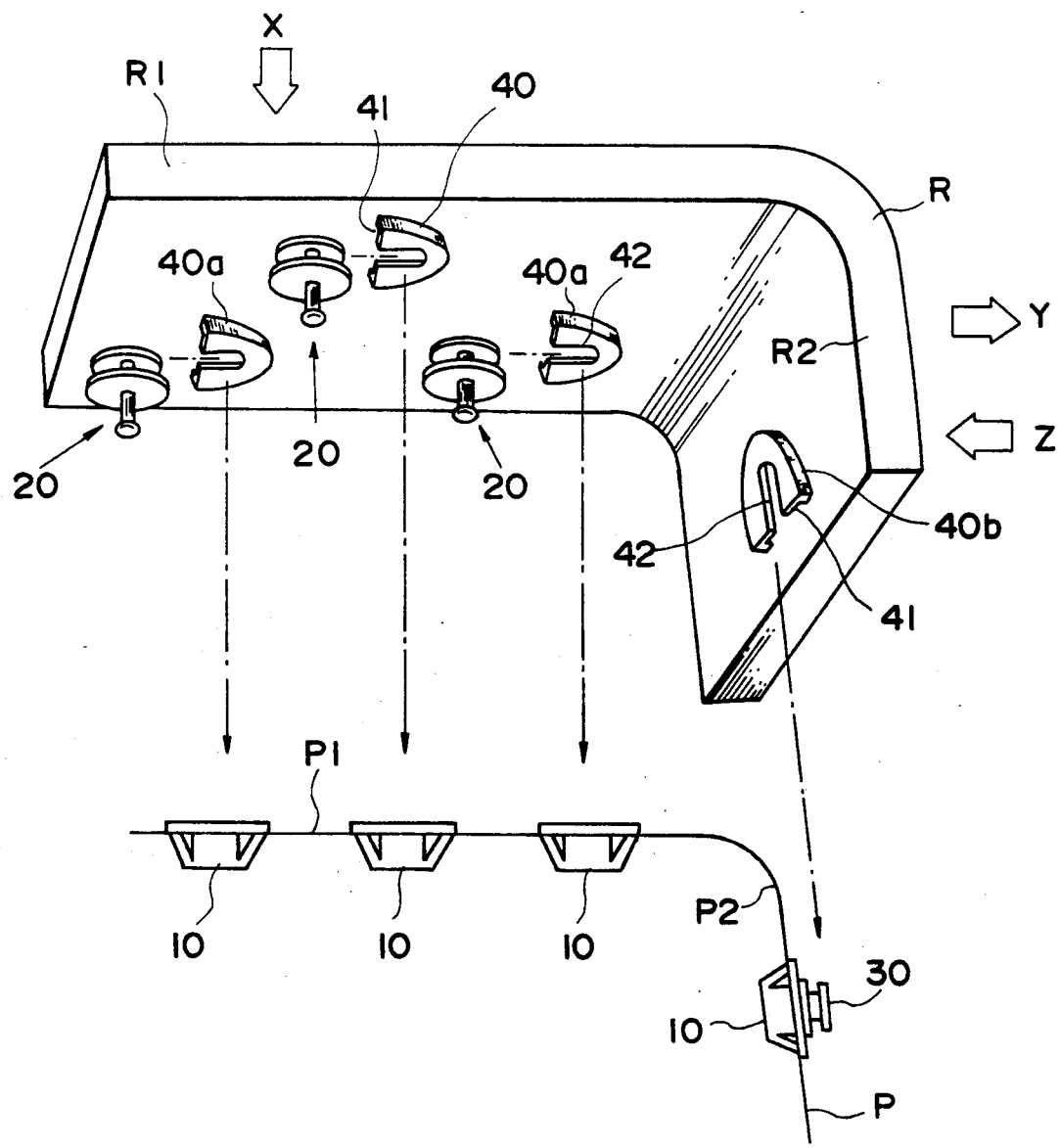
FIG. 1 is an exploded illustration of a mounting structure for a lamp base for an automobile according to the present invention.

FIG. 1 shows an embodiment according to the concept of the present invention.

In FIG. 1, the letter R designates a lamp base, the reference character R1 denotes the front face portion thereof, and the reference character R2 designates the bent side portion thereof. The letter P denotes a vehicle body panel, the reference character P1 designates the front face portion thereof, and the reference character P2 denotes the bent side portion thereof. The reference numeral 10 designates first members, the reference numeral 20 denotes second members, and the reference numeral 30 designates a third member.

A feature of the present invention is that in a mounting structure for mounting the lamp base R on the outer peripheral surface of the vehicle body panel P, the first members 10 are mounted in mounting holes formed at predetermined locations in the vehicle body panel P and the second members 20 are mounted on restraining frames 40 formed on the lamp base R, and the third member 30 is inserted from first in a first member 10 mounted on the side portion P2 of the vehicle body panel P and in this state, the lamp base R is pressed in the direction of arrow X and fixedly mounted.

The side portion P2 of the vehicle body panel P extends in a direction orthogonal to the direction of insertion of the second members 20 into the restraining frames 40.

A second feature of the present invention is that the restraining frames 40 are formed on the lamp base R at locations corresponding to the locations of the mounting holes in the vehicle body panel P, and a slide path 42 and a receiving groove 43 for fixing the second members 20 or the third member 30 are formed in each of the restraining frames 40.

The front surface portion P1 of the vehicle body panel P is formed in the shape of a straight line, and the side portion P2 thereof is bent. The elliptical mounting holes are formed on the panel P at predetermined intervals, and the first members 10 are inserted in these mounting holes, respectively.

Figure 2A:
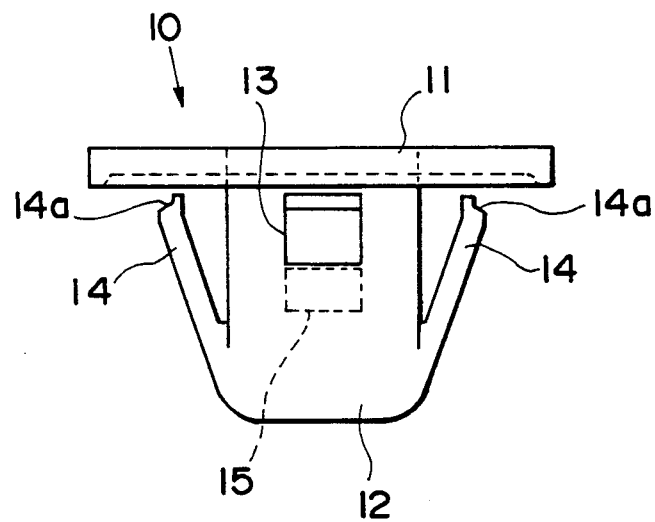
FIGS. 2A and 2B are a front view and a top plan view, respectively, of a first member.
Figure 2B:
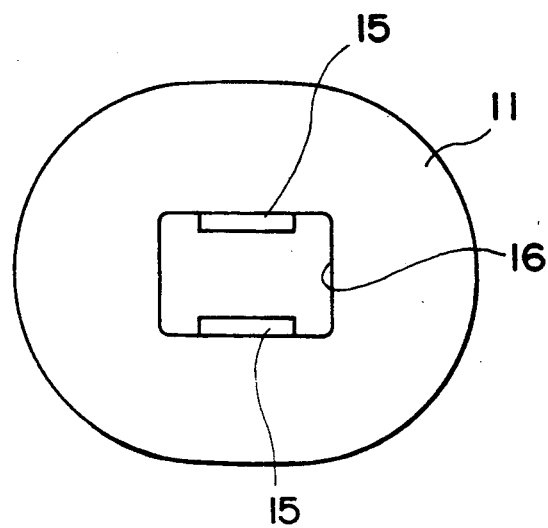

FIG. 2A is a front view of the first member 10, and FIG. 2B is a top plan view thereof.

The first member 10 is a unitary molded article formed of synthetic resin, particularly an industrial material having a resilient force, such as polyacetal or polyamide resin.

The first member 10 comprises an elliptical flange 11, a rectangular holding portion 12 depending from the underside of the flange 11, a restraining portion 13 present on the elongate portion of the holding portion 12, and leg portions 14 extending from the restraining portion 13, the free end of each of the leg portions 14 being formed with a fixing portion 14a.

A holding aperture 16 formed from the surface of the flange portion 11 to the bottom of the holding portion 12 extends through the holding portion 12, and protruding fitting portions 15 are formed on the central portions of the opposite inner walls of the holding aperture.

The first member 10 is engaged with the marginal edge of a panel mounting hole by means of the restraining portion 13 and the fixing portions 14a, and is secured with the leg portions 14 centered on the central portion of the hole.

Figure 3A:
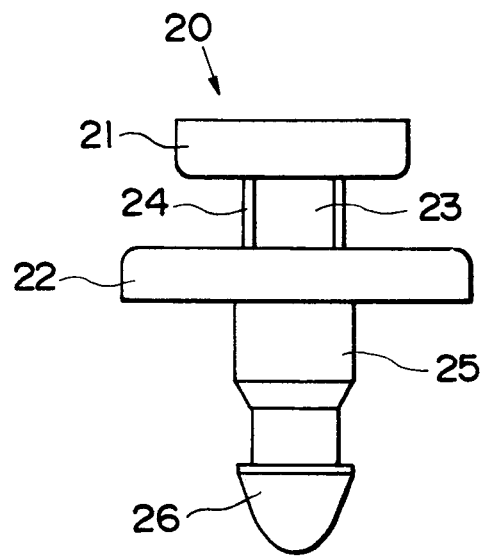
FIGS. 3A and 3B are a front view and a top plan view, respectively, of a second member.
Figure 3B:
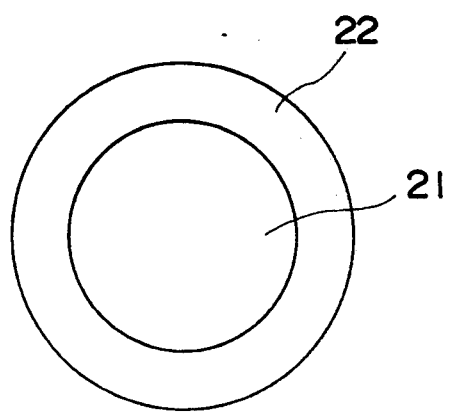

FIG. 3A is a front view of the second member 20, and FIG. 3B is a top plan view thereof.

The second member 20 is also unitarily molded of the same resin material as the first member 10, and has two circular thin-walled parallel flanges 21 and 22, a pillar member 23 connecting the two flanges together and having a protruding portion 24, and a leg portion 25 protruding in one direction, and the tip end of the leg portion 25 provides a diametrically enlarged restraining portion 26.

Figure 4A:
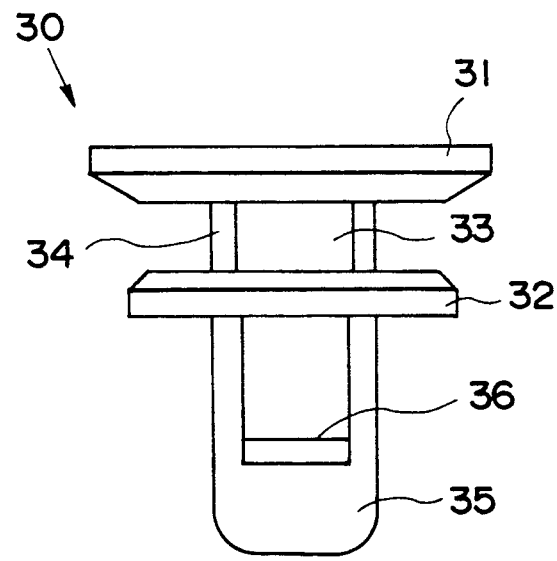
FIGS. 4A and 4B are a front view and a side cross-sectional view, respectively, of a third member.
Figure 4B:
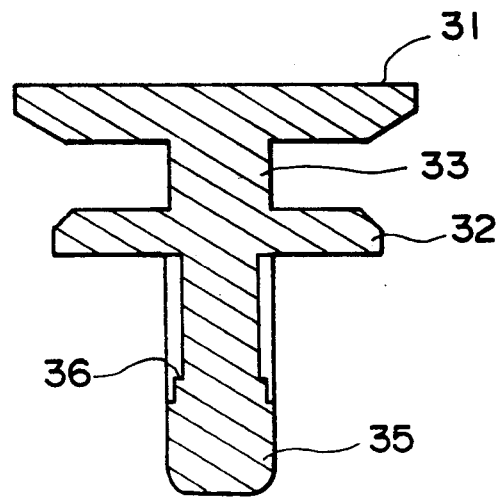

FIG. 4A is a front view of the third member 30, and FIG. 4B is a side cross-sectional view thereof.

The third member 30 is of substantially the same shape as the second member 20, but the difference thereof from the second member lies in the shape of the leg thereof.

That is, the third member 30 comprises two parallel flanges 31 and 32, a pillar member 33 having a protruding portion 34 connecting the flanges together, and a leg 35 extending from the surface of the pillar member 33, the leg 35 being formed with a planar recess 36 for receiving the fitting portion of the inner wall of the first member 10 therein.

The lamp base R is molded in the same shape as the outer shape of the vehicle body panel P and is formed of a resin material, and contains therein a lamp (not shown) which is turned on and off by an operation.

The restraining frames 40 for receiving the second members 20 and the third members 30 therein are molded integrally with the back of the lamp base R at locations corresponding to the mounting holes on the panel P.

Restraining frames 40a formed on the front face portion R1 of the lamp base R are disposed while deviating in the widthwise direction (the direction of the shorter side) relative to the surface of the lamp base R, and each of the restraining frames 40a is formed with a receiving portion 41 for receiving the flanges 21 and 22 therein, the slide path 42 along which the pillar member 23 passes, and receiving grooves 43 engaged by the protruding portions 24 of the pillar member 23, each of the receiving groove 43 being formed in a portion of the slide path 42.

A restraining frame 40b formed on the side portion R2 of the lamp base R which corresponds to the side portion P2 of the vehicle panel P has its slide path 42 facing in a direction orthogonal to the direction of the slide path 42 of another restraining frame 40a, and a receiving groove 43 for receiving the protruding portion 34 of the pillar member 33 is formed in the innermost part of this slide path 42.

When with the above-described construction, the lamp base R is to be mounted on the vehicle body panel P, the first members 10 are first inserted into the mounting holes in the vehicle body panel P. This also holds true of the front face portion P1 and the side portion P2.

Subsequently, the second members 20 are inserted into the respective restraining frames 40a of the front face portion R1 of the lamp base R through the slide paths 42, and the third members 30 are inserted into the first members 10 mounted on the side portion P2 of the vehicle body panel P.

Figure 5:
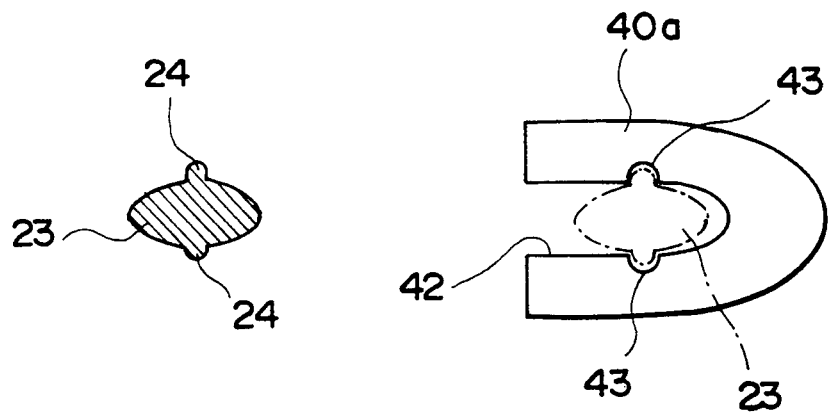
FIG. 5 illustrates the manner in which the pillar portion of the second member is mounted on a restraining frame.
Figure 6:
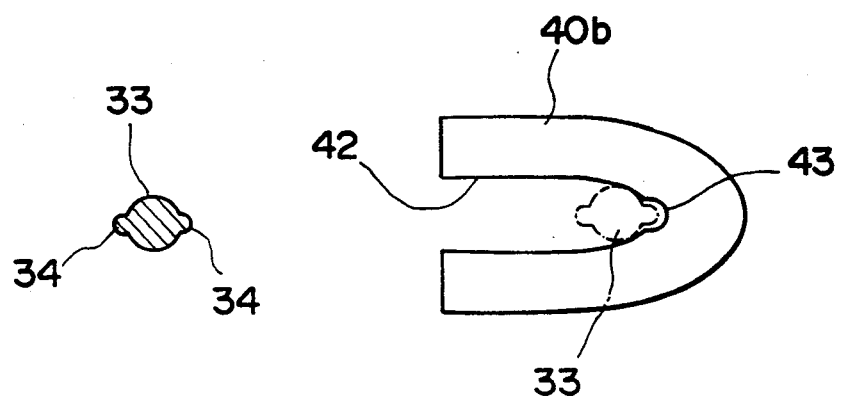
FIG. 6 illustrates the manner in which the pillar portion of the third member is mounted on a restraining frame.

FIG. 5 illustrates the manner in which the second member 20 is inserted into the restraining frame 40a, and FIG. 6 illustrates the manner in which the third member 30 is inserted into the restraining frame 40b.

The protruding portions 24 formed on the pillar member of the second member 20 advance along the slide path 42 and are fixedly engaged with the receiving grooves 43 so that they may not readily slip out.

Likewise, in the case of the third members 30, the protruding portion 34 is inserted into the receiving groove 43 formed in the innermost part of the slide path 42.

When the lamp base R is pushed in the direction of arrow X with the second members 20 not mounted solely on the side portion R2 of the lamp base R as described above, the second members 20 are pushed into the holding holes 16 in the first members 10.

Also, the restraining frame 40b formed on the side portion R2 of the lamp base R is fixed between the flanges 31 and 32 of the third member 30 premounted on the first member 10.

Thus, simply by the pressing step alone, the lamp base R can be mounted on the surface of the panel P.

This is sufficiently rationalized from both the viewpoint of the operation process and the viewpoint of the time process, and is very effective for the assembly process involving an assembly-line operation.

Figure 7:
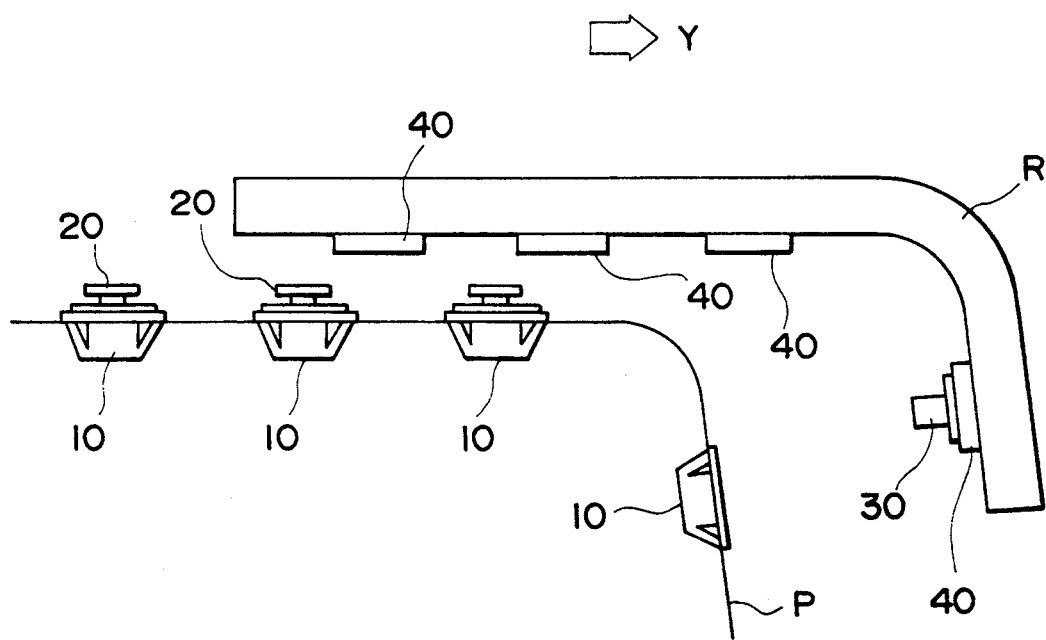
FIG. 7 illustrates the manner in which a lamp base is moved to remove it.

FIG. 7 illustrates the manner in which the lamp base R is removed.

If as shown, the lamp base R is moved in the direction of arrow Y, the third member 30 intactly comes into engagement with the restraining frame 40 and the second members 20 can be simply removed while being engaged with the first members 10 on the surface of the panel P.

Figure 8:
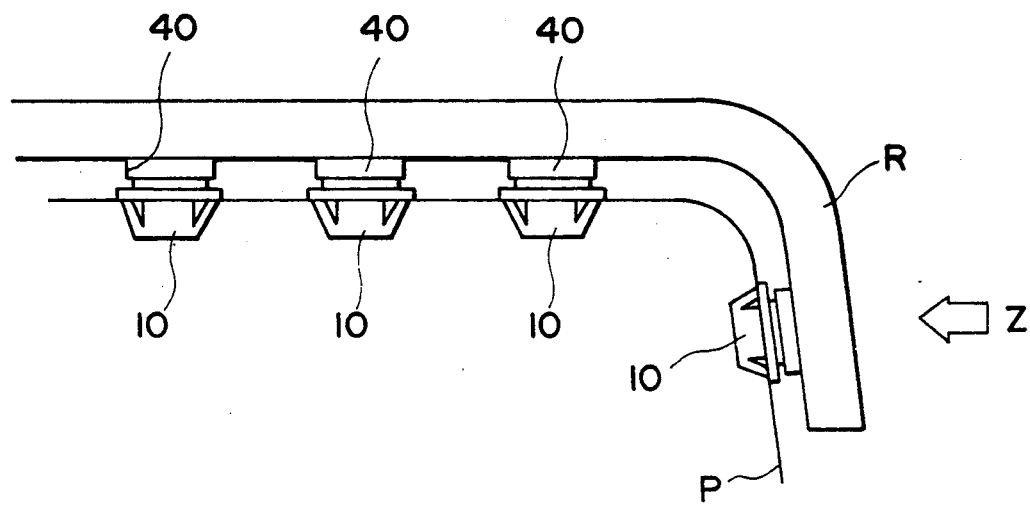
FIG. 8 illustrates the manner in which the lamp base is slidable moved from its state shown in FIG. 7 to mount it.

FIG. 8 illustrates the manner in which the lamp base as it is in the state shown in FIG. 7 is again mounted on the surface of the panel P.

By pressing the lamp base R in the direction of arrow Z, the lamp base can be again fixed to the surface of the panel P, and thus, it becomes possible to effect the mounting and removal of the lamp base R by slidably moving it.

As is apparent from the foregoing description, the present invention is a mounting structure for mounting a lamp base on the outer peripheral surface of a vehicle body panel wherein first members are mounted in mounting holes in said vehicle body panel and second members are mounted on restraining frames formed on the front face portion of said lamp base, and with a third member inserted from first in a first member mounted on a side portion of said vehicle body panel, the lamp base is pressed in one direction to thereby removably mount the lamp base and therefore, the assembly-line operation in the assembly of vehicle bodies can be accomplished solely by a simple pressing-sliding step, and this is very efficient.

Also, each restraining frame is formed with a slide path and a receiving groove, whereby the members can be stably fixed and thus, the lamp bed can be secured by solely pressing, and this is advantageous in terms of work as well.

In addition, the restraining frames differ in their mounted positions in the widthwise direction of the lamp base and therefore, the fixing of the lamp base becomes stable.

Further, when the lamp base is to be removed, the removal can be accomplished by simply pulling it out, and steps using a mechanical jig necessary for bolt-fastening are not required and therefore, there is no possibility of damaging the lamp base, the members and other devices, and this is efficient.

What is claimed is:

1. A mounting structure for mounting a lamp base on the outer peripheral surface of a vehicle body panel comprising:
    a plurality of first members mounted in mounting holes in said vehicle body panel;
    a plurality of restraining frames formed on said lamp base at positions corresponding to said first members;
    a plurality of second members slidably engaged with said restraining frames, each said second member being engagable with respective said first member when said lamp base is shifted in a predetermined mounting direction; and
    at least one third member attached to one of said first members, said third member being slidably engagable with one of said restraining frames when said lamp base is shifted in said mounting direction.

2. A mounting structure according to claim 1, wherein said restraining frames are molded integrally with a back of the lamp base, and wherein a slide path for slidably inserting the second member or the third member and a receiving groove for holding the second or the third member are formed in each of said restraining frames.

3. A mounting structure according to claim 1, wherein, when said lamp base is shifted in a dismounting direction different from said mounting direction, said second member and said third member are respectively detachable from said restraining frame and said first member.

* * * * *